United States Patent
Agrawal

(10) Patent No.: US 8,266,360 B2
(45) Date of Patent: Sep. 11, 2012

(54) I²C-BUS INTERFACE WITH PARALLEL OPERATIONAL MODE

(75) Inventor: Sandeep Agrawal, Bangalore (IN)

(73) Assignee: NXP B.V., Eindhoven (NL)

( * ) Notice: Subject to any disclaimer, the term of this patent is extended or adjusted under 35 U.S.C. 154(b) by 161 days.

(21) Appl. No.: 12/672,948

(22) PCT Filed: Aug. 13, 2008

(86) PCT No.: PCT/IB2008/053246
§ 371 (c)(1),
(2), (4) Date: Feb. 10, 2010

(87) PCT Pub. No.: WO2009/022301
PCT Pub. Date: Feb. 19, 2009

(65) Prior Publication Data
US 2011/0197009 A1 Aug. 11, 2011

(30) Foreign Application Priority Data
Aug. 13, 2008 (EP) ..................... 07114380

(51) Int. Cl.
*G06F 13/14* (2006.01)
(52) U.S. Cl. ........................ 710/305; 713/600
(58) Field of Classification Search ............. 710/305, 710/71, 105; 713/600
See application file for complete search history.

(56) References Cited

U.S. PATENT DOCUMENTS

| 4,689,740 | A | 8/1987 | Moelands et al. |
| 6,507,184 | B1 * | 1/2003 | Elston ........................... 324/107 |
| 2003/0212847 | A1 | 11/2003 | Bandholz et al. |
| 2007/0240011 | A1 * | 10/2007 | Saripalli et al. ............... 713/500 |

FOREIGN PATENT DOCUMENTS

| EP | 1424635 A1 | 6/2004 |
| GB | 2404540 A | 2/2005 |
| KR | 2003-0065820 A | 8/2003 |

OTHER PUBLICATIONS

Anonymous; "I2C Slave to Remote Parallel Bus Master"; Ref. AN:XP013001687, Ref. IRN: ISSN 1533-0001, IP.COM Journal, IP.COM Inc., West Henrietta, NY, US; IPCOM00006592D; 3 PGS (Jan. 16, 2002).
Cvetkovic, M., et al; "I2C-Like Communication for the Power Meter IC"; Microelectronics 2004; 24th Intl' Conf on NIS, Serbia and Montenegro; pp. 781-784 (2004).
International Search Report for In'tl Patent Appln. No. PCT/IB2008/053246 (Jan. 27, 2009).

* cited by examiner

*Primary Examiner* — Clifford Knoll

(57) ABSTRACT

An electronic circuit has an interface for an I²C-bus. The interface comprises a first node for a clock line of the I²C-bus; a second node for a data line of the I²C-bus; and an I²C-bus controller for controlling an operation of the interface under combined control of the clock line and the data line. The circuit has a plurality of further nodes for connecting to a plurality of further data lines. The controller has an operational mode for control of receiving from the further nodes, or for control of supplying to the further nodes, a plurality of data bits in parallel under combined control of the clock line and the data line.

13 Claims, 1 Drawing Sheet

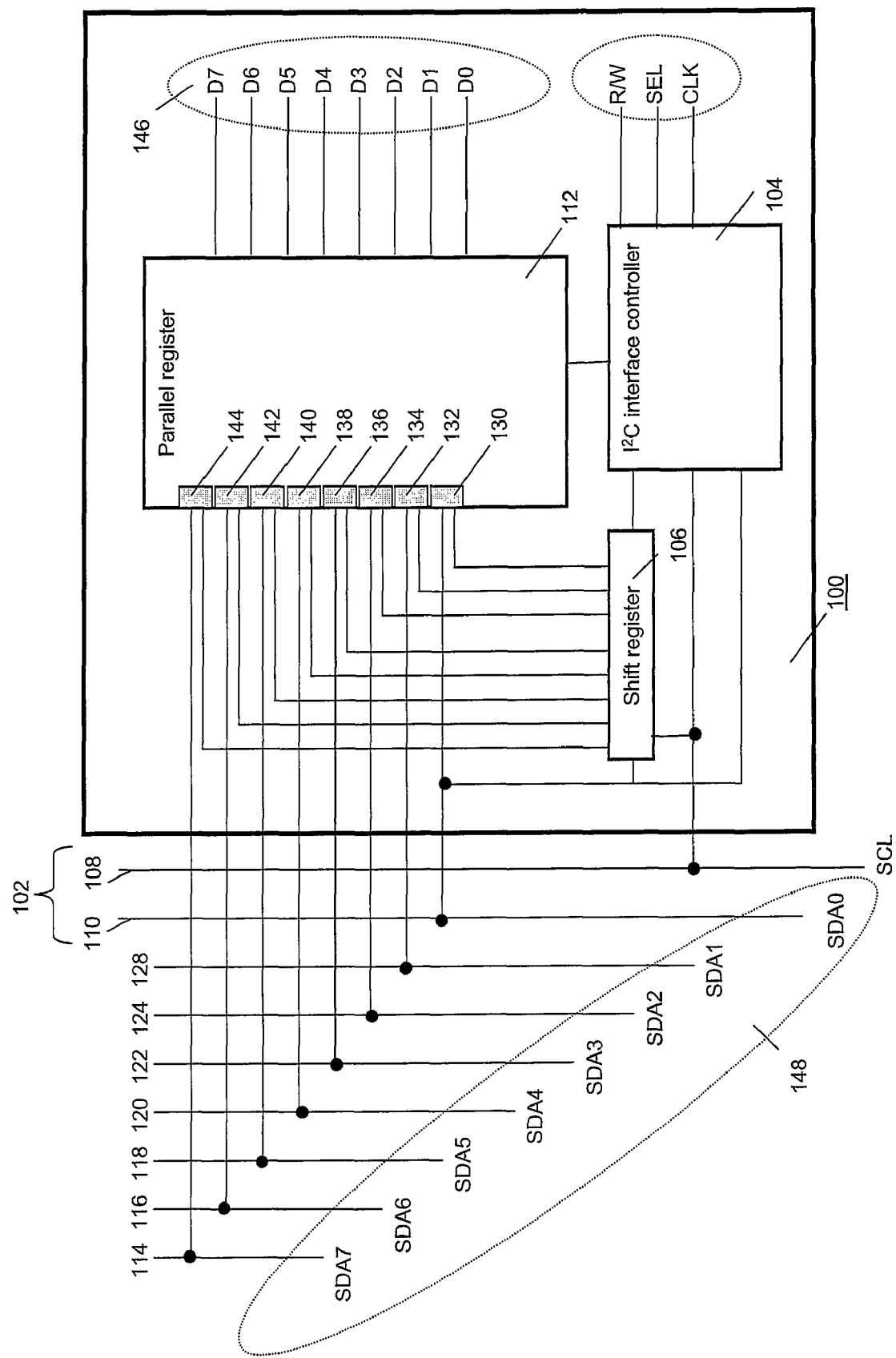

I²C-BUS INTERFACE WITH PARALLEL OPERATIONAL MODE

FIELD OF THE INVENTION

The invention relates to an electronic circuit with an interface for an I²C-bus, and to software for installing on an I²C-bus controller.

BACKGROUND ART

The two-wire I²C-bus (Inter-Integrated Circuit bus) is a well-known serial data bus used for low-speed data communication and control between integrated circuits. The bi-directional I²C-bus uses a single serial clock line (SCL) and a single serial data line (SDA). The I²C-bus is capable of data transfers at a speed of 100 kbits/sec in the Standard Mode, of up to 400 kbits/sec in the Fast Mode, and of 3.4 Mbits/sec in the High Speed mode. Some basic properties of the I²C-bus are described in U.S. Pat. No. 4,689,740, incorporated herein by reference. The skilled person has ready access to an abundance of literature in the art addressing the configuration and usage of the I²C-bus.

SUMMARY OF THE INVENTION

If an application needs to have data transferred at a data rate higher than 3.4 Mbits/sec, the I²C-bus cannot be used for that purpose. The inventor now proposes to configure the I²C-bus design so as to allow higher data rates.

To this end, the inventor proposes to an electronic circuit with an interface for an I²C-bus. The interface comprises a first node for a clock line of the I²C-bus; a second node for a data line of the I²C-bus; and an I²C-bus controller for controlling an operation of the interface under combined control of the clock line and the data line. The circuit has a plurality of further nodes for connecting to a plurality of further data lines. The controller has an operational mode for control of receiving from the further nodes, or for control of supplying to the further nodes, a plurality of data bits in parallel under combined control of the clock line and the data line.

Accordingly, the invention enables to extend the number of bits to be transferred through the I²C interface, by means of providing additional data nodes and having the data transfer controlled as under the conventional I²C bus protocol. With respect to the feature "a plurality of further nodes", it is remarked that this also includes an embodiment of a single further node within the context of this invention.

In an embodiment, the circuit of the invention comprises a parallel register having a plurality of terminals; and means for connecting the plurality of the terminals to the first and further nodes under control of the controller. The parallel register buffers the data in the transfers between the nodes and the rest of the circuit. The controller operating under the I²C-bus protocol thus controls the transfer of a group of bits in parallel. The number of bits thus transferred in parallel can be equal to, or lower than, the number of terminals in order to provide a flexible configuration, still using the conventional I²C-bus protocol.

In a further embodiment, the circuit comprises a shift register connected to the second node, which is also a feature in conventional I²C circuitry. In the invention, the means is operative to selectively connect the terminals to the shift register or to the further nodes. A single one, two, more or all of the terminals can be connected to the shift register, so as to implement the conventional I²C for the terminals thus connected. Some or all of the remaining terminals can be left unused or can be used for the parallel transfer of bits. That is, under proper control, serial and parallel data transfer can occur at the same time using the I²C-bus protocol.

In a still further embodiment, the controller is operative to control the means to connect all of the plurality of terminals either to the first and further nodes, or to the shift register. Thus, the controller implements either the conventional serial bit I²C-bus protocol, or the parallel bit transfer.

The invention also relates to software for installing on an I²C-bus controller in an electronic circuit with an interface for an I²C-bus. The interface comprises a first node for a clock line of the I²C-bus, a second node for a data line of the I²C-bus; and a plurality of further nodes for connecting to a plurality of further data lines. The I²C-bus controller is operative to control an operation of the interface under combined control of the clock line and the data line. The software has instructions for control of receiving from the further nodes, or for control of supplying to the further nodes, a plurality of data bits in parallel under combined control of the clock line and the data line. As known, an I²C-bus controller can be implemented using a general-purpose controller running a piece of dedicated software. The invention can also be implemented on a general-purpose controller with a piece of software that takes care of the parallel bit transfer under the conventional I²C protocol.

The configuration of the invention, referred to as Parallel Inter IC (PI²C), can be used for high-speed data transfer (a higher rate than the 3.4 Mbits/sec mentioned above). The PI²C-bus is based on sending the entire word or byte (it can be extended for 16 bits or 32 bits) in a single operational I²C-cycle, and hence the data transfer rate can be increased by a factor of eight for an 8-bits byte. In this byte-mode operation the maximum obtainable speed in the I²C high-speed mode is approximately 8×3.4 (27) MBits/sec. However, seven more data pins need to be provided. The PI²C device has a nine-pin interface (one for data and one for the clock as in the conventional I²C operation, and seven more for data). The bus is fully backward-compatible with (serial) I²C as the various pre-defined I²C states are signaled using the I²C clock line (SCL) and the least significant data bit (SDA0).

For completeness, reference is made to the following publications.

Korean patent application publication 1020030065820 relates to a bus expanding device for a micro control unit (MCU) of a vehicle information terminal. The MCU has an I²C interface. The data line of the I²C interface is connected to a plurality of expanders, and the clock line of the I²C interface is connected to the same plurality of expanders. Each expander then converts the I²C interface signals to signals appropriate for an SPI (Serial Peripheral Interface) bus for connection to a plurality of peripheral devices. This reference neither teaches nor suggests an I²C-bus controller configured for parallel bit transfer as in the invention.

IP.COM JOURNAL, IP.COM INC., West Henrietta, N.Y., US, "I²C Slave To Remote Parallel Bus Master", reference PAN: IPCOM000006592D, reference AN: XP013001687, reference IRN: ISSN 1533-0001, publication date Jan. 16, 2002, addresses the following issue. Today there are commercially available devices that can be attached to a micro-controller parallel bus and act as an I²C master device, and there are devices that are I²C slaves that have a single byte of generic I/O. However if a design requires more than eight bits accessible via I²C, it will get expensive to keep adding another device for every eight bits, and there are only eight unique address for that device, so a single bus can only support up to sixty four bits total. This publication discloses a design that solves the bit limitation by implementing an address bus that allows the user to select different bytes by specifying an address. This allows the users to attach to an I²C bus any device that was designed to interface directly to a micro-controller. This makes a larger number of electronics devices accessible by a common three-wire interface. When used with the I²C master device mentioned earlier, this invention allows the creation of a remote parallel bus with an I²C interface. Again, this reference neither teaches nor suggests an I²C-bus controller configured for parallel bit transfer as in the invention.

BRIEF DESCRIPTION OF THE DRAWING

The invention is explained in further detail, by way of example and with reference to the accompanying drawing, wherein FIG. 1 is a block diagram of a circuit in the invention.

DETAILED EMBODIMENTS

FIG. 1 is a block diagram of a circuit 100 with an I²C-compatible serial interface for use in a data communication system with an I²C-bus 102. The interface has an I²C controller 104, typically a state machine, and a shift register 106 for use in the conventional I²C mode, i.e., using a single clock line 108 (SCL) and a single data line 110 (SDA0). Controller 104 has control inputs R/W, SEL and CLK. Control input R/W determines whether circuit 100 is to receive data ("read") from, or to supply data ("write") to, the I²C-bus. Control input SEL serves to select an operational mode of controller 104 as is explained below. Control input CLK receives the internal clock signals generated at, or on behalf of, circuit 100. Shift register 106 serves to supply to I²C-bus 102 or to receive from I²C-bus 102, that is a serial bus, the individual bits making up the data or addresses to be processed by circuit 100. Circuit 100 comprises a parallel register 112 that serves to receive from shift register 106 the individual bits to be processed, e.g., in parallel, in remaining circuitry (not shown) of circuit 100, or to supply to register 106 the bits generated in parallel in circuit 100 and to be serially communicated over I²C-bus 102. The interface is then operating in the conventional I²C mode. As known, operation of the conventional I²C interface controller occurs under combined control of the data on data line 110 and the clock signal on clock line 108.

Circuit 100 also comprises a plurality of further data lines 114, 116, ..., and 128. Controller 104 has an operational mode for control of receiving from data lines 110, 114-124, or supplying to data lines 110, 114-124, a plurality of data bits in parallel under combined control of clock line 108 and data line 110, e.g., the least significant bit data line. Controller 104 keeps implementing the I²C-bus protocol in that the signals on lines 108 and 110, together with control inputs R/W, SEL and CLK, determine the data transfer to, or from, data lines 110, 114-124. In other words, the I²C protocol can now be used for the parallel transfer of data bits, whereas conventionally this protocol has been used for a bit-serial interface.

Circuit 100 comprises a parallel register 112 with a plurality of terminals, and means 130, 132 ..., and 144 for connecting the plurality of the terminals to data lines 110, 114-124 under control of the controller. Means 130-144 comprises, e.g., a plurality of bi-directional multiplexers. Means 130-144 is controlled by controller 104 to selectively create data paths to the shift register or to data lines 114-128. For example, controller 104 is operative to control means 120-144 to connect all inputs/outputs of parallel register 112 either to data lines 110, 114-124 or to shift register 106. In the latter control mode, operation of circuit 100 is fully compatible with the I²C protocol. In the former mode, the I²C control protocol is used for the parallel transfer of data bits. In another example, selected ones of means 130-144 create data paths between parallel register 112 to associated ones of data lines 110, 114-124, and other selected ones of means 130-144 create data paths between parallel register 112 and shift register 106. A hybrid data transfer with both serial and parallel bit supply is then created. Accordingly, an internal data bus 146 of circuit 100 can be made to interface with an external bus 148 made up by one, some, or all of data lines 110, 114-128.

The invention claimed is:

1. An electronic circuit with an interface for an I²C-bus, wherein the interface comprises:
   a first node for a clock line of the I²C-bus;
   a second node for a data line of the I²C-bus;
   an I²C-bus controller for controlling an operation of the interface under combined control of the clock line and the data line; and
   a plurality of further nodes for connecting to a plurality of further data lines; and wherein the controller has an operational mode for control of receiving from the further nodes, or for control of supplying to the further nodes, a plurality of data bits in parallel under combined control of the clock line and the data line.

2. The circuit of claim 1, further comprising:
   a parallel register having a plurality of terminals; and
   means for connecting the plurality of the terminals to the first and further nodes under control of the controller.

3. The circuit of claim 2, further comprising:
   a shift register connected to the second node, and
   wherein the means for connecting is operative to selectively connect the terminals to the shift register or to the further nodes.

4. The circuit of claim 2, wherein the controller is operative to control the means for connecting all of the plurality of terminals either to the first and further nodes, or to the shift register.

5. Software stored on a non-transitory computer-readable medium in an I²C-bus controller in an electronic circuit with an interface for an I²C-bus, wherein
   the interface comprises a first node for a clock line of the I²C-bus, a second node for a data line of the I²C-bus, and a plurality of further nodes for connecting to a plurality of further data lines;
   the I²C-bus controller is operative to control an operation of the interface under combined control of the clock line and the data line; and
   the software has instructions for control of receiving from the further nodes, or for control of supplying to the further nodes, a plurality of data bits in parallel under combined control of the clock line and the data line.

6. The software of claim 5, the instructions being stored on a non-transitory computer-readable medium in the electronic circuit.

7. The software of claim 5, wherein the instructions are for control of receiving and supplying the data bits in parallel over further data lines on the I²C-bus.

8. The software of claim 5, wherein the instructions control the communication of data bits in parallel under the combined control of the clock line and the data line over the further data lines on the I²C-bus, in accordance with a protocol for communicating on the I²C-bus.

9. The circuit of claim 1, wherein the plurality of further nodes are configured and arranged to communicate via the plurality of further data lines on the I²C-bus.

10. The circuit of claim 1, wherein the controller is configured and arranged to control the communication of data bits in parallel under the combined control of the clock line and the data line over the further data lines on the I²C-bus, in accordance with a protocol for communicating on the I²C-bus.

11. The circuit of claim 1, wherein the controller is configured and arranged to control the communication of data bits in parallel on the I²C-bus over the data line via the second node and over a further data line via a further node, in accordance with a protocol for communicating on the I²C-bus.

12. The circuit of claim 11, further comprising a parallel register having a plurality of terminals coupled to the second and further nodes and configured and arranged for communicating data in parallel on the I²C-bus via the second and further nodes.

13. The circuit of claim 1, wherein the controller is configured and arranged to control the communication of data bits in parallel on the I²C-bus over the data lines, in accordance with a protocol for communicating on the I²C-bus, to send an entire word or byte in a single operational I²C-bus cycle.

\* \* \* \* \*